United States Patent
Egawa et al.

(10) Patent No.: US 7,664,155 B2
(45) Date of Patent: Feb. 16, 2010

(54) GAS LASER OSCILLATING UNIT

(75) Inventors: Akira Egawa, Shizuoka (JP); Takafumi Murakami, Yamanashi (JP); Akihiko Nishio, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 112 days.

(21) Appl. No.: 11/771,725

(22) Filed: Jun. 29, 2007

(65) Prior Publication Data

US 2008/0013585 A1     Jan. 17, 2008

(30) Foreign Application Priority Data

Jul. 13, 2006   (JP) ............... 2006-192929

(51) Int. Cl.
*H01S 3/03* (2006.01)
*H01S 3/223* (2006.01)
(52) U.S. Cl. .......................... 372/61; 372/58
(58) Field of Classification Search .................. 372/61, 372/33, 38, 87
See application file for complete search history.

(56) References Cited

U.S. PATENT DOCUMENTS

| 4,457,000 A | * | 6/1984 | Rao ............... 372/58 |
| 4,470,144 A | | 9/1984 | Sano et al. |
| 4,624,001 A | | 11/1986 | Gurs |
| 4,704,719 A | | 11/1987 | Weiss |

FOREIGN PATENT DOCUMENTS

| DE | 19537673 A1 | | 4/1997 |
| JP | 5-167133 | * | 7/1993 |
| JP | 5167133 A | | 7/1993 |
| JP | 06-326379 A1 | | 11/1994 |
| JP | 09-199772 A1 | | 7/1997 |
| JP | 2003-283008 A1 | | 10/2003 |
| JP | 2004-235517 A1 | | 8/2004 |

OTHER PUBLICATIONS

Notice of Reasons for Rejection of Patent Application No. 2006-192929 mailed Feb. 26, 2008.
EP Search Report of Application No. 07012819.4-2222 dated Oct. 11, 2007.

* cited by examiner

*Primary Examiner*—Minsun Harvey
*Assistant Examiner*—Patrick Stafford
(74) *Attorney, Agent, or Firm*—Lowe Hauptman Ham & Berner LLP

(57) ABSTRACT

A gas laser oscillating unit having a gas junction part where gas flow may be stable, whereby a stable laser beam output and/or a laser beam that does not fluctuate very much may be achieved. The laser gas, flowing through first and second excitation parts, is introduced into the first and second tapered gas flow passages. After that, the two gas flows are mixed at or near the center point of a gas junction part and the mixed gas flows in a next flow passage. Then, one of the gas flows from the first excitation part is biased toward the −X direction by a first biasing member arranged in the first gas flow passage, and the other gas flow from the second excitation part is biased toward the +X direction by a second biasing member arranged in the second gas flow passage.

4 Claims, 3 Drawing Sheets

GAS LASER OSCILLATING UNIT

RELATED APPLICATIONS

The present application claims priority from Japanese Patent Application No. 2006-192929, filed on Jul. 13, 2006, the entire contents of which are fully incorporated herein by reference.

BACKGROUND OF THE INVENTION

1. Field of the Invention

The present invention relates to a gas laser oscillating unit, in particular, a gas laser unit provided with a gas flow passage having a junction.

2. Description of the Related Art

In an axial-flow type laser oscillating unit, a gas flow passage of the unit has been improved, in which a laser medium or laser gas flows in an excitation part in order to generate a laser beam by discharging, a light reaction or chemical reaction. For example, in Japanese Unexamined Patent Publication (Kokai) No. 6-326379, a taper portion is provided on the inlet and outlet portions of a flow passage for a laser gas, in order to reduce the pressure loss of the passage. In Japanese Unexamined Patent Publication (Kokai) No. 9-199772, the shape of the front portion of an excitation part of a gas flow passage is configured in order to make the gas flow in a discharge tube a spiral flow, thereby stabilizing the discharge.

Further, in Japanese Unexamined Patent Publication (Kokai) No. 2003-283008 or Japanese Unexamined Patent Publication (Kokai) No. 2004-235517, two excitation parts are arranged on the same laser beam axis, and two gas flows collide with each other at a junction part between the two excitation parts. It is advantageous to merge the two flows from the two excitation parts, instead of having two separate flows, since the number of components of the flow passage may be reduced and the length of the non-excitation part may be shortened. Due to a reduction in the number of components, the cost of the laser oscillating unit may be reduced. Further, due to the shortened length of the non-excitation part, the efficiency of laser oscillation may be improved, since the energy loss of the laser beam is reduced.

FIGS. 5 and 6 are perspective views showing an example of the structure of a junction part of a laser gas of the axial-flow type laser oscillation, as described in Japanese Unexamined Patent Publication (Kokai) No. 2003-283008 or Japanese Unexamined Patent Publication (Kokai) No. 2004-235517. As shown in FIG. 5, a tapered gas flow passages 161a is arranged between the excitation part 103a and a junction part 123, and a tapered gas flow passage 161b is arranged between the excitation part 103b and the junction part 123. The two opposing tapered passages 161a and 161b are symmetric about an axis 152 extending through a center point 151 of the junction part 123 and perpendicular to a laser axis 104. In other words, the two tapered portions are plane-symmetric about a plane including the axis 152 and perpendicular to the laser axis 104.

Therefore, two gas flows (having the same flow rate and velocity) are generated in two flow passages, and then the two gas flows collide with each other at or near the center point 151. In this case, the state of the gas flow in the junction part 123 is unstable or easily varies. For example, the state of the gas flow at a given time t1 is represented in FIG. 5, and then the state of the gas flow at another given time t2 may be changed as shown in FIG. 6. In other words, in the state of FIG. 5, the gas flows 180a and 180b flowing from the −X and +X excitation parts 103a and 103b are biased to the −X and +X directions, respectively, and merge in the junction part 123. On the other hand, in the state of FIG. 6, the gas flows 180a and 180b are biased to the +X and −X directions, respectively, and merge in the junction part 123. At this point, as shown in FIGS. 5 and 6, the X-direction is perpendicular to both the axis (or Y-direction) parallel to the laser axis and the longitudinal axis of a gas flow passage 162 (or Z-direction) arranged downstream relative to the junction part 123. In this example, the state of the gas flow is changed from time t1 to time t2, in other words, the state of the gas flow is unstable. Also, such an unstableness of gas flow, in two opposing gas flow passages constituting the plane-symmetrical structure, has been studied by numeric analysis, such as a finite element method of gas flow.

The laser gas, after flowing through the excitation part, is activated and has the property of absorbing the laser beam. Therefore, when the gas flow is unstable, the laser output and/or the shape of the laser beam mode may fluctuate. For example, in a laser machining process, the quality of a cut surface of a product may be deteriorated. Further, when the laser is used as a light source, the quantity of light may fluctuate.

The above Japanese Unexamined Patent Publication (Kokai) No. 6-326379 and Japanese Unexamined Patent Publication (Kokai) No. 9-199772 disclose ways to modify the gas flow passage. However, the ways are not directed to a technique for avoiding frontal collision of the gas flows as described in Japanese Unexamined Patent Publication (Kokai) No. 2003-283008 or Japanese Unexamined Patent Publication (Kokai) No. 2004-235517.

SUMMARY OF THE INVENTION

An object of the present invention is to provide a gas laser oscillating unit capable of stabilizing the gas flow in the junction part, whereby the laser output is stable and the temporal change of the laser beam mode is minimized.

Accordingly, the invention provides a gas laser oscillating unit comprising: first and second gas flow passages through which a gas medium for laser oscillation flows; a gas junction part where the first and second gas flow passages join together; and first and second excitation parts, arranged in the first and second gas flow passages, respectively, the first and second excitation parts being positioned along the same laser axis and configured to excite the medium gas; wherein the structure of the first gas flow passage from the first excitation part to the gas junction part and the structure of the second gas flow passage from the second excitation part to the gas junction part are not plane-symmetric.

Concretely, the first gas flow passage from the first excitation part to the gas junction part and the second gas flow passage from the second excitation part to the gas junction part are 180-degree rotationally-symmetric about a center axis extending through the center point of the gas junction part and perpendicular to the laser axis.

A biasing member may be arranged in each of the first gas flow passage from the first excitation part to the gas junction part and the second gas flow passage from the second excitation part to the gas junction part, so as to change the direction of the gas flow in each gas flow passage.

A preferred example of the biasing member is a plate member.

Otherwise, the shape of the first gas flow passage from the first excitation part to the gas junction part and the shape of the second gas flow passage from the second excitation part to the gas junction part may be not plane-symmetric.

A preferred example of each excitation part is a discharge tube for generating a laser beam.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
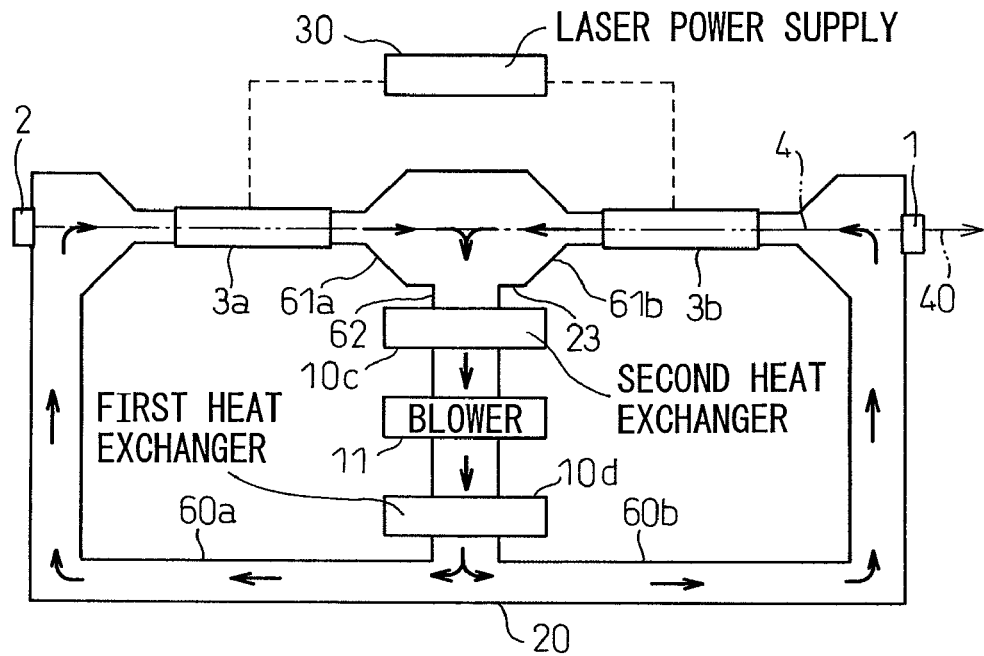
FIG. 1 shows a schematic configuration of a gas laser oscillating unit according to the present invention.

The present invention will be described below with reference to the drawings. FIG. 1 shows a schematic configuration of a gas laser oscillating unit having a gas junction part according to the present invention. A gas medium for laser oscillation, such as carbon dioxide or nitrogen (hereinafter, referred to as "laser gas") is fed by a blower 11, cooled by a first heat exchanger 10$d$ and divided into two flows at a gas bifurcation point 20. The first heat exchanger 10$d$ and a second heat exchanger 10$c$ described below are configured to carry out heat exchange between the laser gas and cooling water. One of the two flows after the bifurcation point flows in a gas flow passage 60$a$ and a first excitation part 3$a$, and the other of the two flows in a gas flow passage 60$b$ and a second excitation part 3$b$. The laser gas is excited while flowing in the first or second excitation part, whereby a laser active state is generated. For example, each excitation part may be a discharge tube, to which electrical power is supplied from a laser power supply 30, so as to generate electrical discharge in the laser gas. However, the excitation part may be another type, such as using a chemical reaction.

The first and second excitation parts 3$a$ and 3$b$ are arranged between an output mirror 1 and a rear mirror 2. When a light generated in each excitation part is amplified and oscillated between the two mirrors, a laser beam is generated on a laser axis 4. Since the output mirror 1 is a semitransparent mirror, the laser beam passing through the mirror 1 is outputted as a laser beam 40. The laser gas flowing through the first and second excitation parts 3$a$ and 3$b$ flows in tapered gas flow passage 61$a$ and 61$b$, respectively, and collide with each other at a gas junction part 23. After that, the mixed gas flows into a gas flow passage 62 and is cooled in the second heat exchanger 10$c$, before returning to the blower 11.

The basic configuration of the gas laser oscillating unit as described above may be the same of the prior art. The blower and the heat exchanger arranged in the gas flow passage are not essential components for the unit. Further, although the unit of FIG. 1 has two excitation parts and one gas junction part, the invention may be applied to a gas laser oscillating unit having four excitation parts and two gas junction parts, for example.

Figure 2:
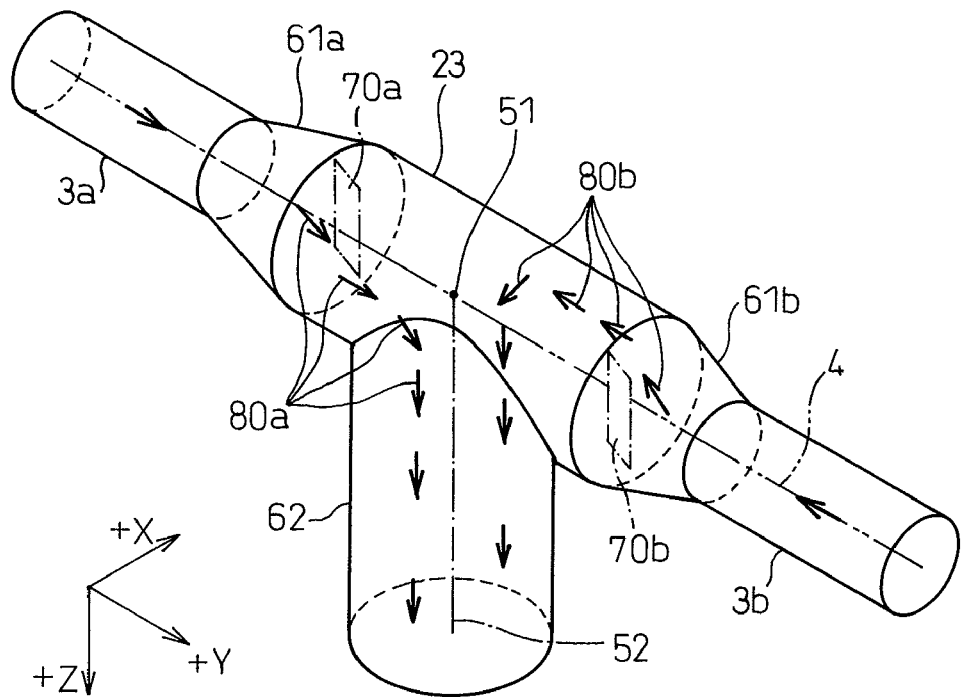
FIG. 2 is an enlarged perspective view of a gas junction part of a gas laser oscillating unit according to a first embodiment of the invention.

FIG. 2 is an enlarged view of the gas junction part 23 according to a first embodiment of the invention. As shown, in the invention, a first biasing member 70$a$ is arranged between the first excitation part 3$a$ and the junction part 23, and a second biasing member 70$b$ is arranged between the second excitation part 3$b$ and the junction part 23. The first gas flow passage 61$a$ including the first biasing member 70$a$ and the second gas flow passage 61$b$ including the second biasing member 70$b$ are asymmetrical about a center axis 52 passing through a center point 51 of the junction part 23 and extending in the Z-direction (or perpendicular to the laser axis 4). In other words, the gas flow passages 61$a$ and 61$b$ are not plane-symmetric about a plane including the center point 51 and perpendicular to the laser axis 4.

The laser gas flows, through the first and second excitation parts 3$a$ and 3$b$ respectively, are introduced into gas flow passages 61$a$ and 61$b$, and then mixed near the center point 51 of the junction part 23. After that, the mixed gas flows into the gas flow passage 62. At this point, the gas flow from the first excitation part 3$a$ is biased toward the −X direction in the gas junction part 23 by means of the first biasing member 70$a$ in the gas flow passage 61$a$, as indicated by arrows 80$a$. On the other hand, the gas flow from the second excitation part 3$b$ is biased toward the +X direction in the gas junction part 23 by means of the second biasing member 70$b$ in the gas flow passage 61$b$, as indicated by arrows 80$b$. As shown in FIG. 2, X-direction is perpendicular to both of the laser axis (Y-direction) and the longitudinal axis of the gas passage 62 (Z-direction). Due to such configuration, the laser gas flows from the opposing gas passages do not collide with each other at or near the center point of the gas junction part and thus do not induce the unstable and changeable gas flow. As a result, the stable laser beam may be obtained.

Figure 3:
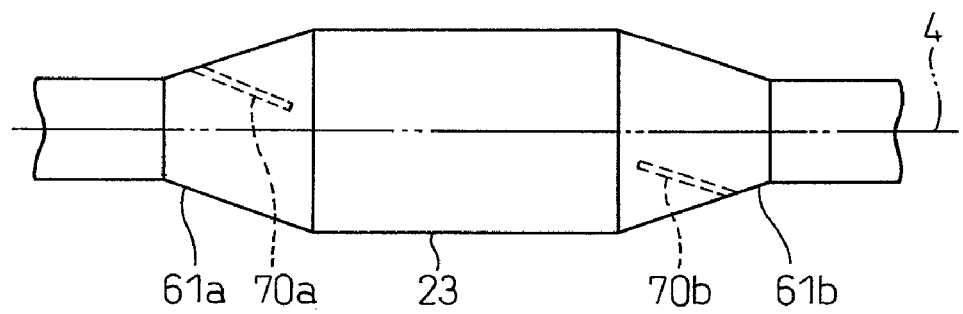
FIG. 3 is a top view of the gas junction part of FIG. 2.

FIG. 3 is a top view of the first and second biasing members 70$a$ and 70$b$ viewed in the Z-direction. For example, the biasing members 70$a$ and 70$b$ are plate members, made from metal, ceramics or resin, capable of changing the flow direction of the laser gas. As shown in FIGS. 2 and 3, the biasing members 70$a$ and 70$b$ are arranged so as not to interfere with the laser axis 4. Further, the biasing members are configured and positioned to be 180-degree rotationally-symmetric about the center axis 52 extending through the center point 51 and perpendicular to the laser axis 4. Each biasing member may be arranged in the gas flow passage in a known manner. However, the first and second members may be integral with the first and second gas flow passages 61$a$ and 61$b$, respectively. In this embodiment, each biasing member is illustrated as a plate member, however, any figure is possible as long as the plane-asymmetry of the two gas flow passages can be attained.

As in the embodiment of FIGS. 2 and 3, it is advantageous to constitute the first and second gas flow passages 61$a$ and 61$b$, each having the biasing member, so as to be 180-degree rotationally-symmetric about the axis 52, in view of the number of the kinds of the parts of the laser oscillating unit. However, it would be obvious that the major effect of the invention may be achieved by the plane-asymmetric structure, even if it is not rotationally-symmetric.

Figure 4:
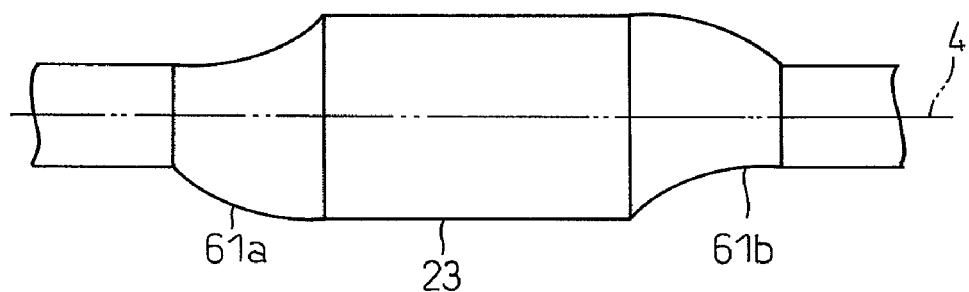
FIG. 4 is a top view of a gas junction part of a gas laser oscillating unit according to a second embodiment of the invention.
Figure 5:
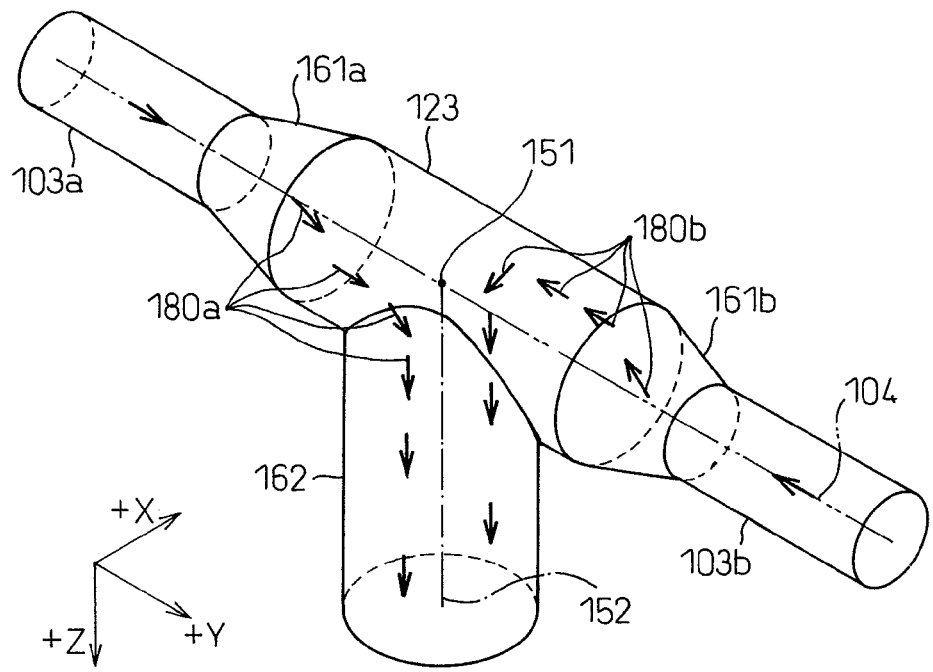
FIG. 5 shows the gas flow at a given time in a gas junction part of a conventional gas laser oscillating unit.
Figure 6:
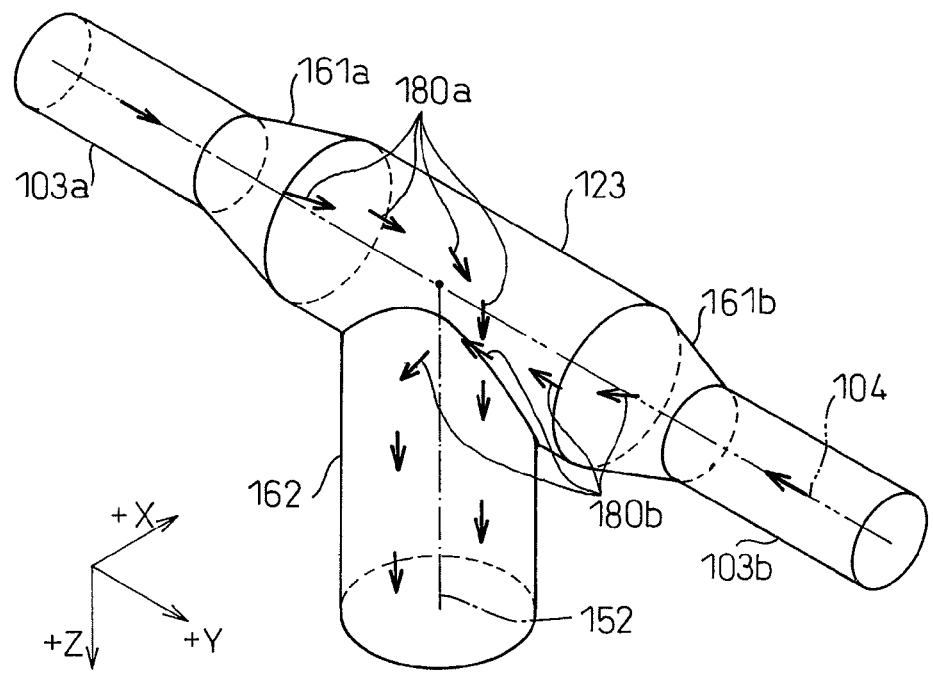
FIG. 6 shows the gas flow at different time from that of FIG. 5.

FIG. 4 is a top view, viewed in the Z-direction, of the gas junction part 23 of the gas laser oscillating unit according to a second embodiment of the invention. In the second embodiment, the biasing member as shown in FIGS. 2 and 3 are not arranged, instead, each of the first and second gas flow passages 61$a$ and 61$b$ has the shape of a distorted taper. In other words, each gas flow passage is not rotationally-symmetric about the laser axis 4, however, the two gas flow passages are 180-degree rotationally-symmetric about the center axis 52 each other. Due to this configuration, the opposing gas flow passages 61$a$ and 61$b$ may be not plane-symmetric, whereby the gas flow in the first passage 61a is biased toward the −X direction and the gas flow in the second passage 61b is biased toward the +X direction. Therefore, the gas flow in the gas junction part in the second embodiment may also be stable, as in the first embodiment.

As described above, when the opposing gas flow passages are not plane-symmetric each other, the change of the fluctuation of the gas flow in the gas junction part may be eliminated or reduced in comparison with the plane-symmetric case, whereby the gas flow may be stable. This has been confirmed by a numeric analysis using a finite element method of gas flow.

According to the present invention, by constituting the opposing two gas flow passages to be not plane-symmetric, a frontal collision between them may be avoided due to an offset between two main streams of the two gas flow. Therefore, the unstableness of the gas flow in the gas junction part may be prevented, whereby the more stable laser beam output and/or the less fluctuated laser beam mode may be achieved.

By constituting the first gas flow passage between the first excitation part and the gas junction part and the second gas flow passages between the second excitation part and the gas junction part, to be 180-degree rotationally-symmetric about the center axis, passing through the center point of the gas junction part and perpendicular to the laser axis, the number of the kinds of the parts for manufacturing the laser oscillating unit may be reduced. Therefore, the laser oscillating unit is advantageous in view of the cost and maintenance.

As a concrete constitution for achieving the plane-asymmetric structure, the biasing plate member arranged in the first and second gas flow passages, or the first and second gas flow passage, each of which is not rotationally-symmetric about the laser axis, may be possible. Both of the constitutions may fulfill the object of the invention by the simple structure.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A gas laser oscillating unit comprising:
   first and second gas flow passages through which a gas medium for laser oscillation flows;
   a gas junction part where the first and second gas flow passages join together; and
   first and second excitation parts, arranged in the first and second gas flow passages, respectively, the first and second excitation parts being positioned along the same laser axis and configured to excite the medium gas;
   wherein the structure of the first gas flow passage from the first excitation part to the gas junction part and the structure of the second gas flow passage from the second excitation part to the as unction part are not plane-symmetric in relation to a plane including the center point of the gas junction part and extending perpendicular to the laser axis, and are 180-degree rotationally-symmetric about a center axis extending through the center point of the gas junction part and perpendicular to the laser axis,
   and wherein the first gas flow passage is configured to divert the gas medium entering into the gas junction part away from the laser axis in a first direction and the second gas flow passage is configured to divert the gas medium entering into the gas junction part away from the laser axis in a second direction, wherein the first direction is different from the second direction.

2. The gas laser oscillating unit as set forth in claim 1, wherein a biasing member is arranged in each of the first gas flow passage from the first excitation part to the gas junction part and the second gas flow passage from the second excitation part to the gas junction part, so as to change the direction of the gas flow in each gas flow passage.

3. The gas laser oscillating unit as set forth in claim 2, wherein the biasing member is a plate member.

4. The gas laser oscillating unit as set forth in claim 1, wherein the first direction is opposed to the second direction.

* * * * *